(12) United States Patent
Ohashi

(10) Patent No.: US 10,866,387 B2
(45) Date of Patent: Dec. 15, 2020

(54) IMAGING OPTICAL SYSTEM AND IMAGING APPARATUS

(71) Applicant: Kazuyasu Ohashi, Chiba (JP)

(72) Inventor: Kazuyasu Ohashi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 98 days.

(21) Appl. No.: 16/305,720

(22) PCT Filed: May 31, 2017

(86) PCT No.: PCT/JP2017/020365
§ 371 (c)(1),
(2) Date: Nov. 29, 2018

(87) PCT Pub. No.: WO2017/209220
PCT Pub. Date: Dec. 7, 2017

(65) Prior Publication Data
US 2020/0041762 A1    Feb. 6, 2020

(30) Foreign Application Priority Data
Jun. 3, 2016    (JP) .................................. 2016-112185

(51) Int. Cl.
*G02B 9/60*    (2006.01)
*G02B 13/04*    (2006.01)
(Continued)

(52) U.S. Cl.
CPC .................. *G02B 9/60* (2013.01); *G02B 9/62* (2013.01); *G02B 13/0045* (2013.01); *G02B 13/04* (2013.01)

(58) Field of Classification Search
USPC ........................................................ 359/770
See application file for complete search history.

(56) References Cited

U.S. PATENT DOCUMENTS 6,222,685 B1    4/2001 Yamada
6,239,921 B1    5/2001 Isono
(Continued)

FOREIGN PATENT DOCUMENTS

CN    103901583 A    7/2014
JP    9-166748 A    6/1997
(Continued)

OTHER PUBLICATIONS

International Search Report and Written Opinion issued on Aug. 23 2017 in PCT/JP2017/020365 dated May 31, 2017.
(Continued)

*Primary Examiner* — Darryl J Collins
(74) *Attorney, Agent, or Firm* — Oblon, McClelland, Maier & Neustadt, L.L.P.

(57) ABSTRACT

An imaging optical system includes a first lens having a concave image side surface and a negative refractive power; a second lens having a convex object side surface and a positive refractive index; a third lens having a concave object side surface and a negative refractive power; a fourth lens having a convex image side surface and a positive refractive power; and a fifth lens having a convex object side surface and a positive refractive power in the order from the object side to the image side, optionally includes a lens on the image side of the fifth lens. The imaging optical system satisfies conditional expressions [1] $1.94<n_2<2.20$ and [2] $15.0<v_2<20.0$, where $v_2$ and $n_2$ represents an Abbe number and a refractive index of a lens material of the second lens L2 at d-line, respectively.

9 Claims, 8 Drawing Sheets

(51) Int. Cl.
*G02B 13/00* (2006.01)
*G02B 9/62* (2006.01)

(56) References Cited

U.S. PATENT DOCUMENTS

| | | | |
|---|---|---|---|
| 2010/0103538 A1* | 4/2010 | Kitahara | G02B 9/62 359/794 |
| 2011/0249349 A1 | 10/2011 | Asami | |
| 2013/0265656 A1 | 10/2013 | Asami, I | |
| 2016/0154230 A1 | 6/2016 | Katakura | |
| 2017/0023777 A1 | 1/2017 | Nakayama | |

FOREIGN PATENT DOCUMENTS

| | | |
|---|---|---|
| JP | 9-197266 A | 7/1997 |
| JP | 11-142730 A | 5/1999 |
| JP | 2000-180718 A | 6/2000 |
| JP | 2003-131126 A | 5/2003 |
| JP | 2007-249189 A | 9/2007 |
| JP | 2008-107391 A | 5/2008 |
| JP | 2008-257108 A | 10/2008 |
| JP | 2009-223183 A | 10/2009 |
| JP | 2009-258659 A | 11/2009 |
| JP | 2010-107531 A | 5/2010 |
| JP | 2013-47753 A | 3/2013 |
| JP | 5576717 B2 | 7/2014 |
| JP | 5855793 B2 | 12/2015 |
| JP | 2017-15893 A | 1/2017 |
| JP | 2017-26891 A | 2/2017 |
| JP | 2017-26897 A | 2/2017 |
| WO | WO 2012/086199 A1 | 6/2012 |
| WO | WO 2015/025843 A1 | 2/2015 |

OTHER PUBLICATIONS

Warren J. Smith, "Modern Lens Design," McGraw-Hill, Inc., XP055152035, 1992, 5 Pages.

Ohara Corporation, "OHARA Optical Glass Chart 2015," Retrieved from the Internet: [URL: http://www.oharacorp.com/pdf/glass-chart-2015.pdf], XP055397510, 2015, 2 Pages.

Hoya Corporation, "HOYA Glass catalogue 2015 Abbe diagram," Retrieved from the Internet: [URL: http://www.hoya-opticalworld.com/common/diagram/pdf/HOYAmap_ndvd_20150508.pdf], XP055397717, May 8, 2015, 1 Page.

Combined Chinese Office Action and Search Report issued Jul. 2, 2020 in Patent Application No. 201780033035.7 (with English language translation), 21 pages.

* cited by examiner

[Fig. 1]
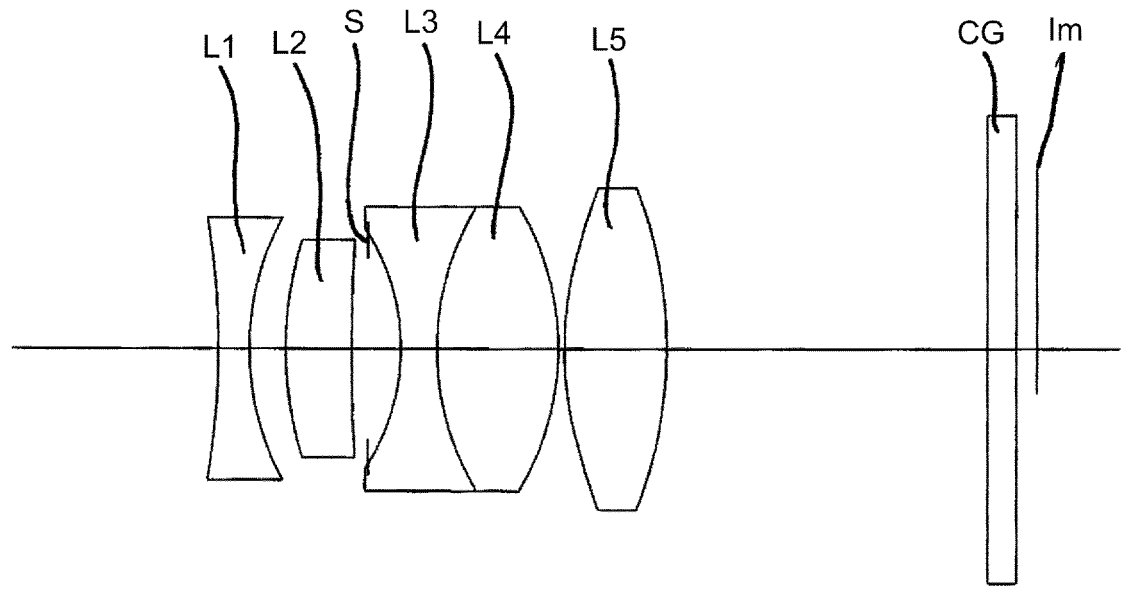
[Fig. 2]
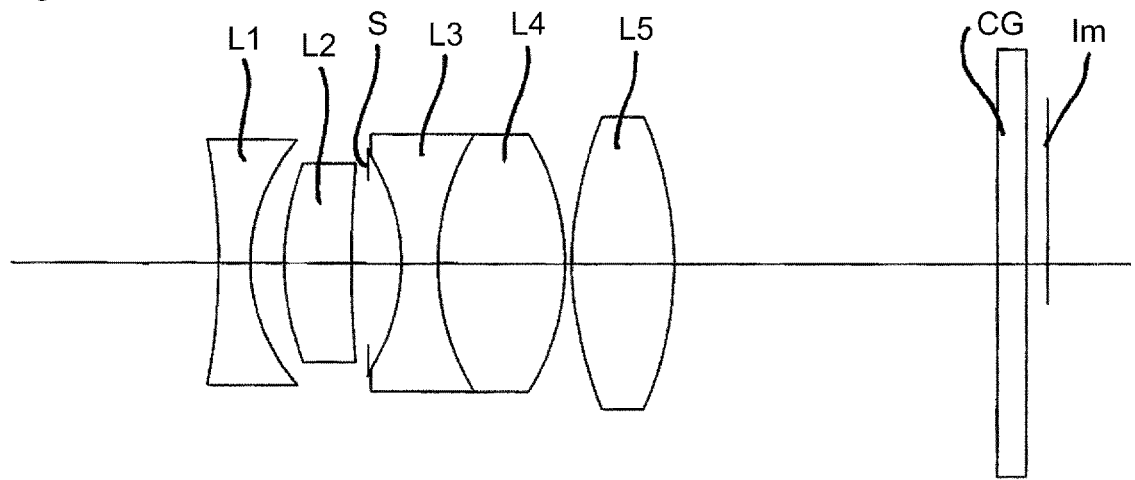
[Fig. 3]
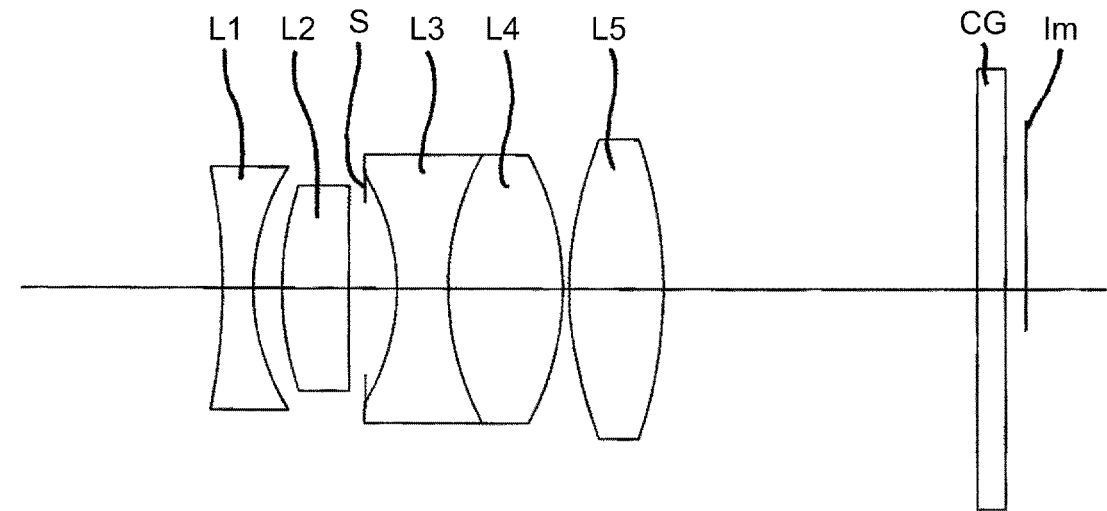

[Fig. 4]
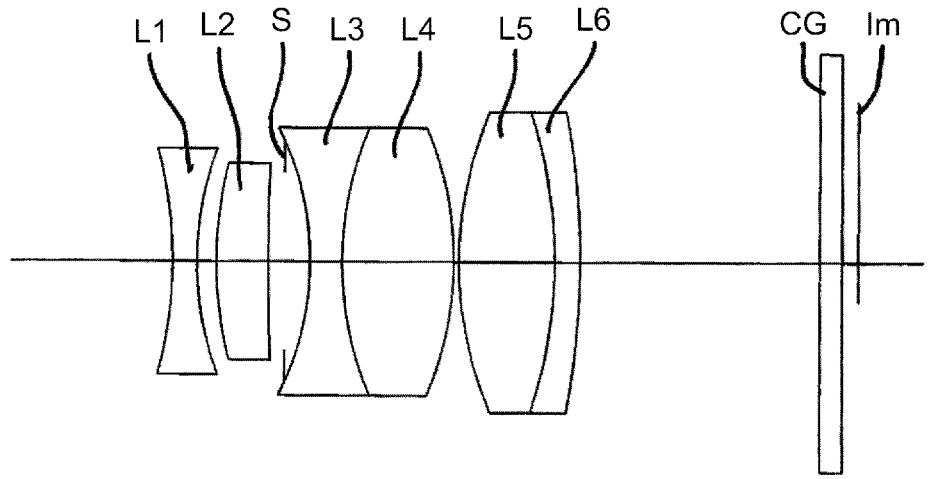
[Fig. 5]
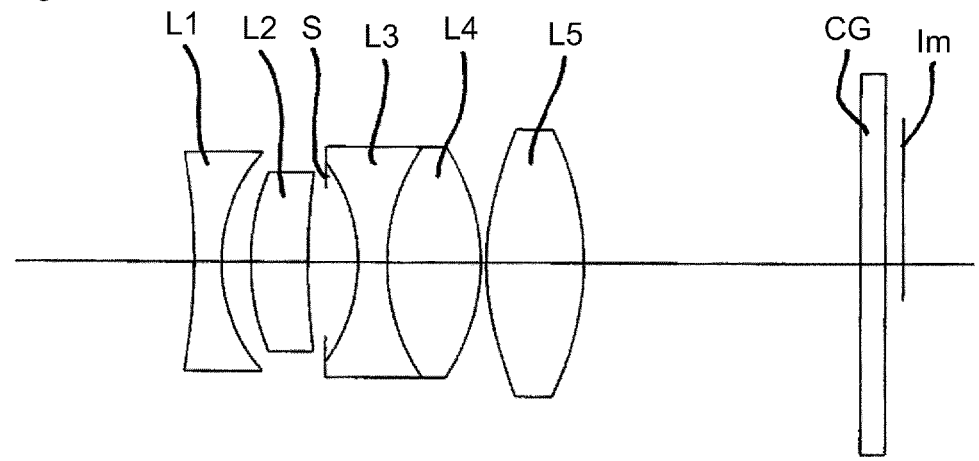
[Fig. 6]
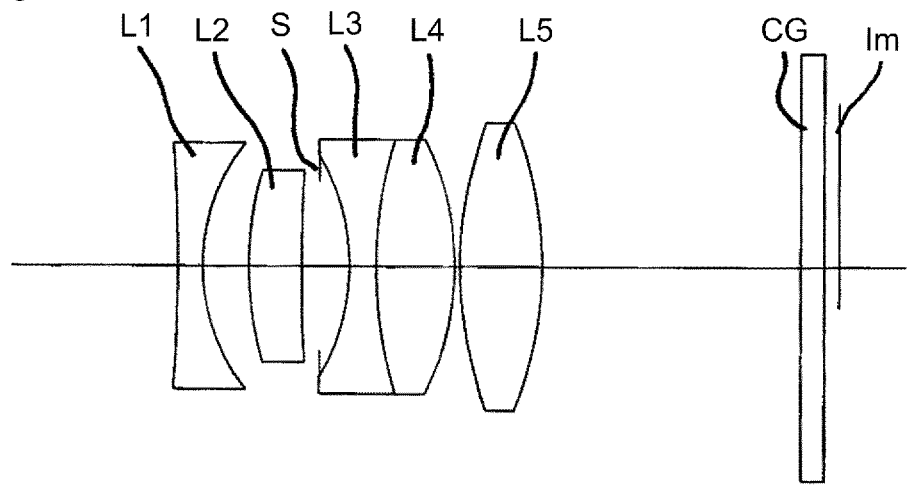

[Fig. 7]
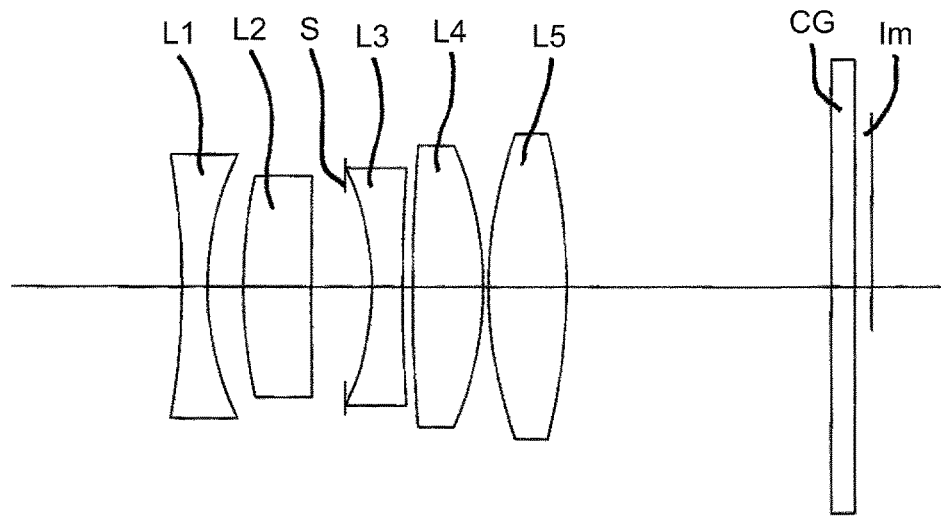
[Fig. 8]
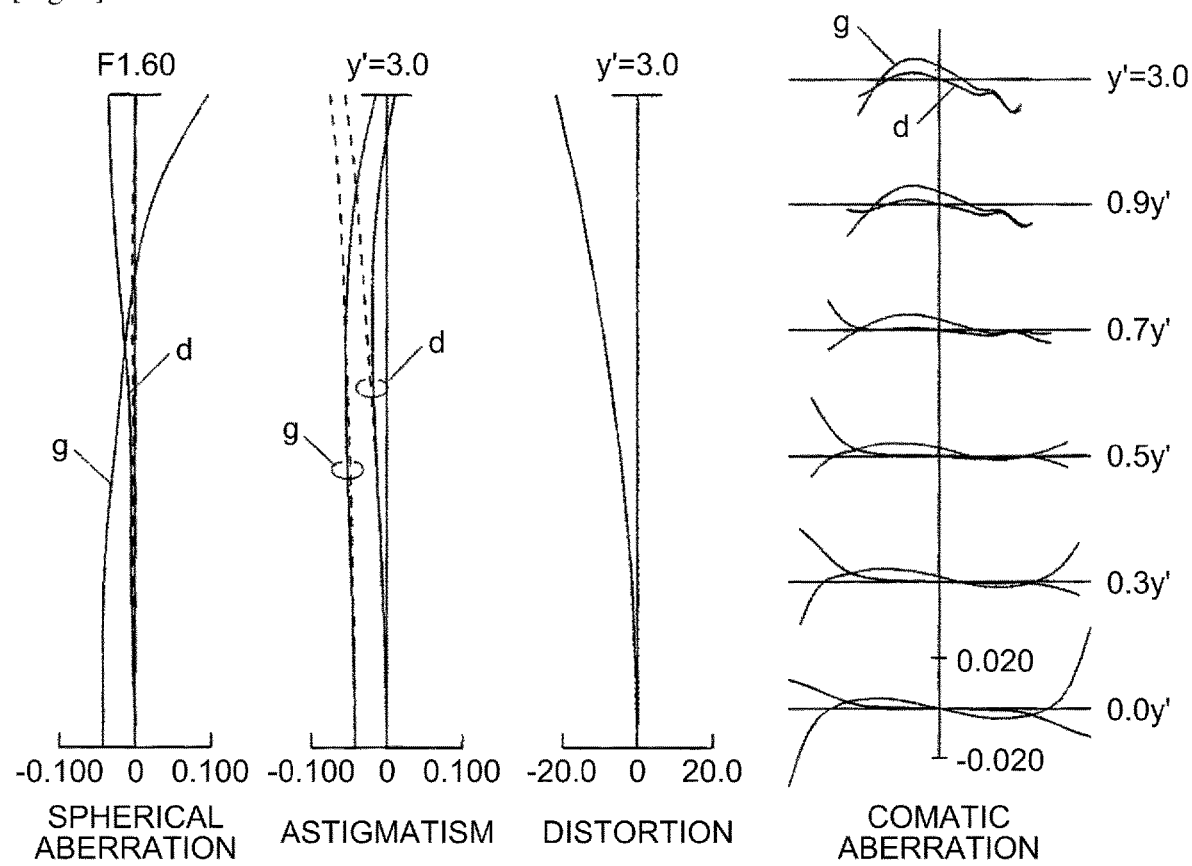

[Fig. 9]
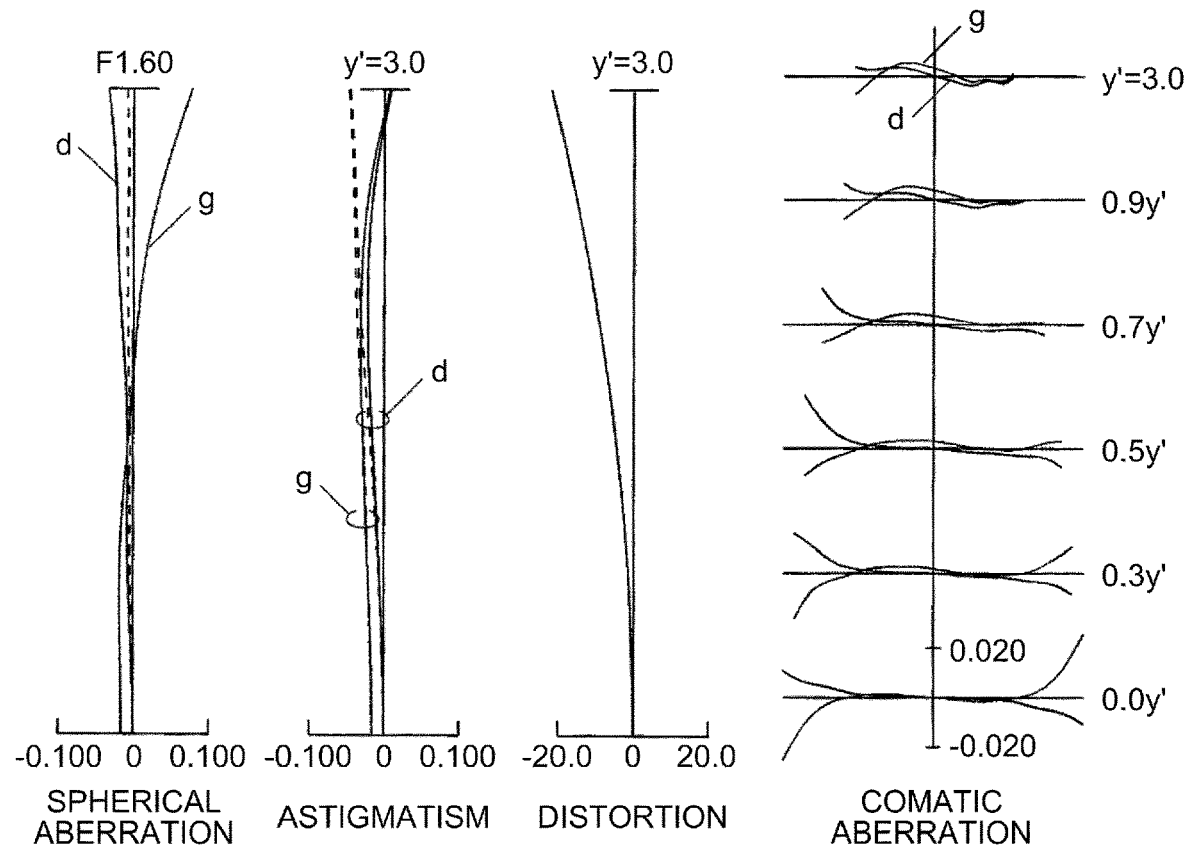
[Fig. 10]
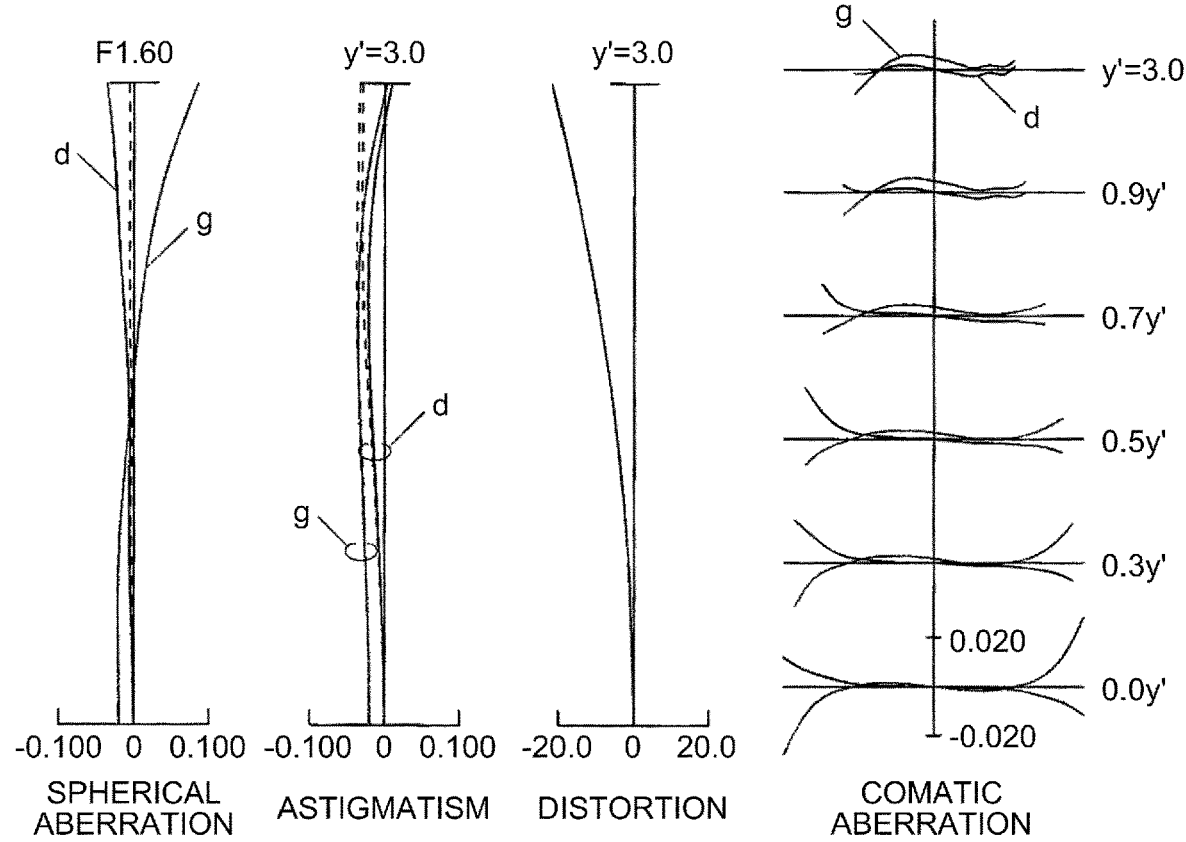

[Fig. 11]
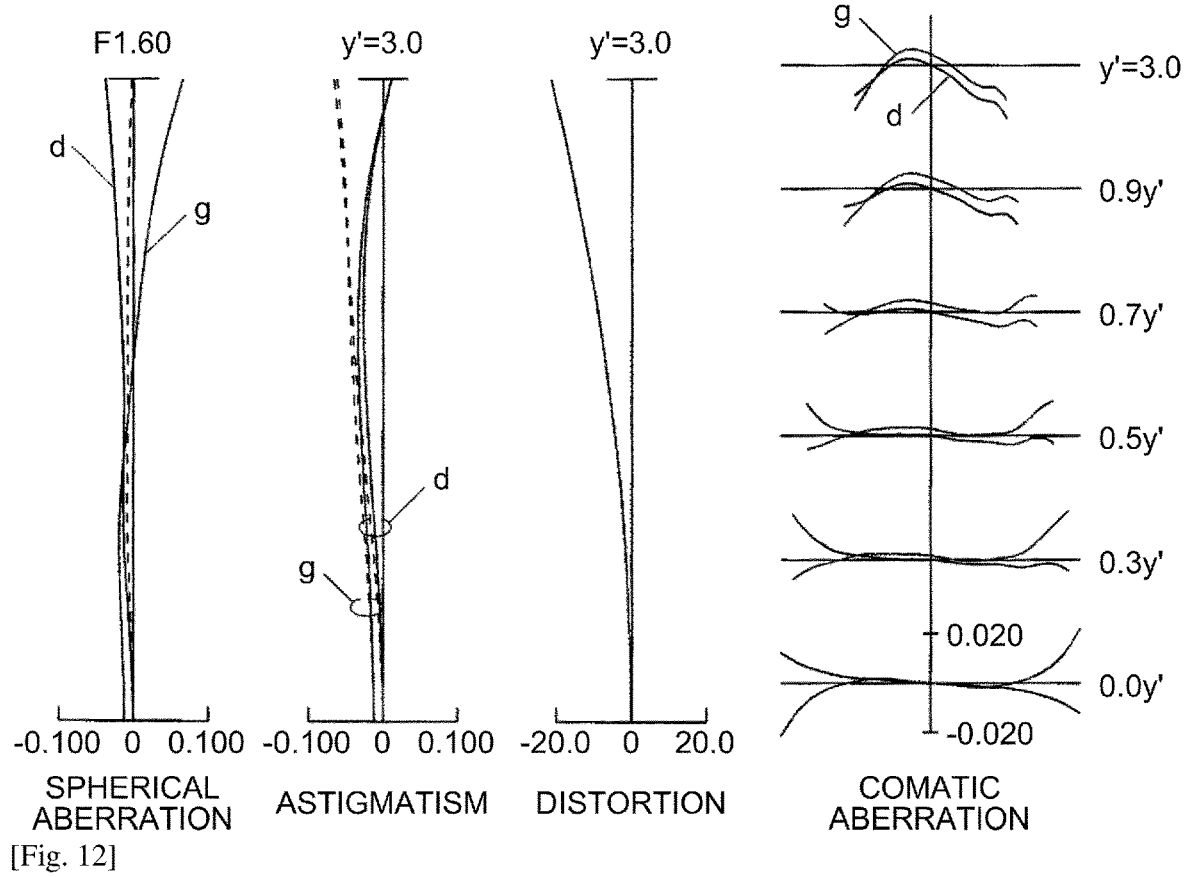
[Fig. 12]
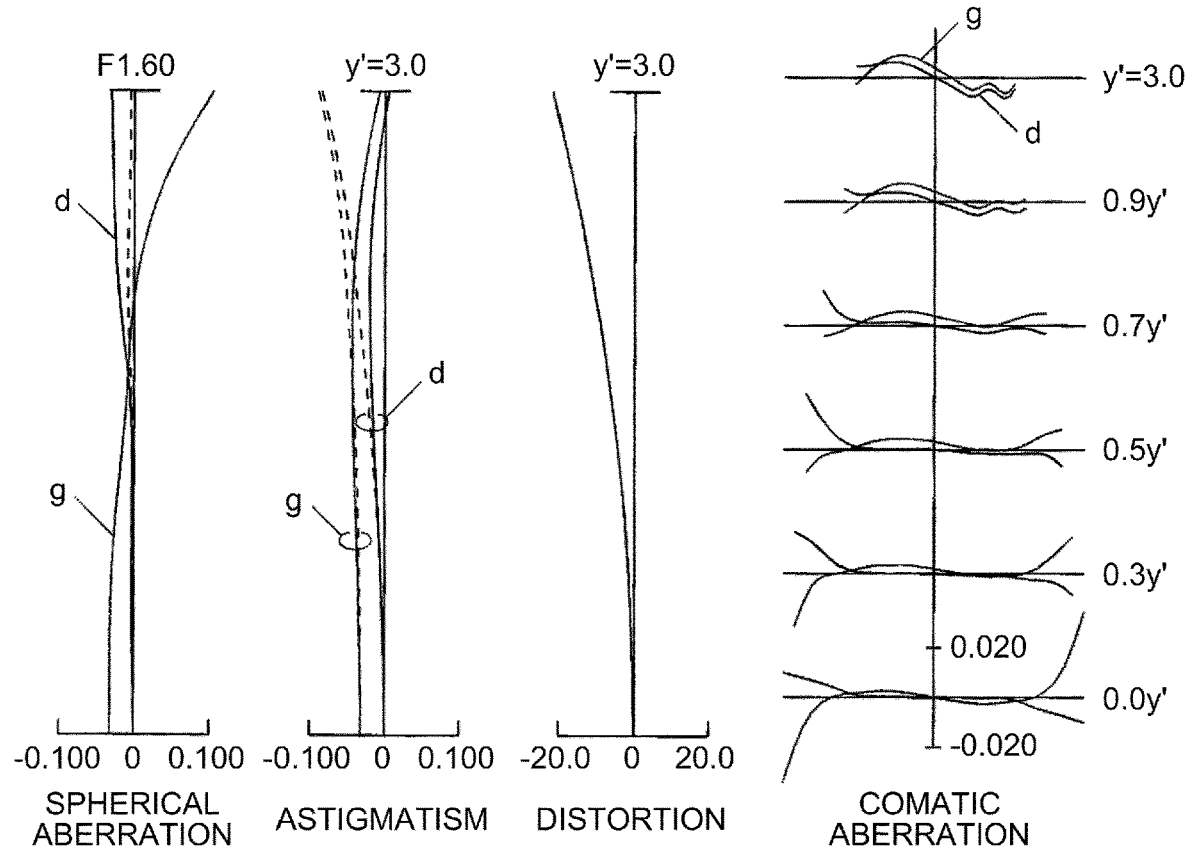

[Fig. 13]
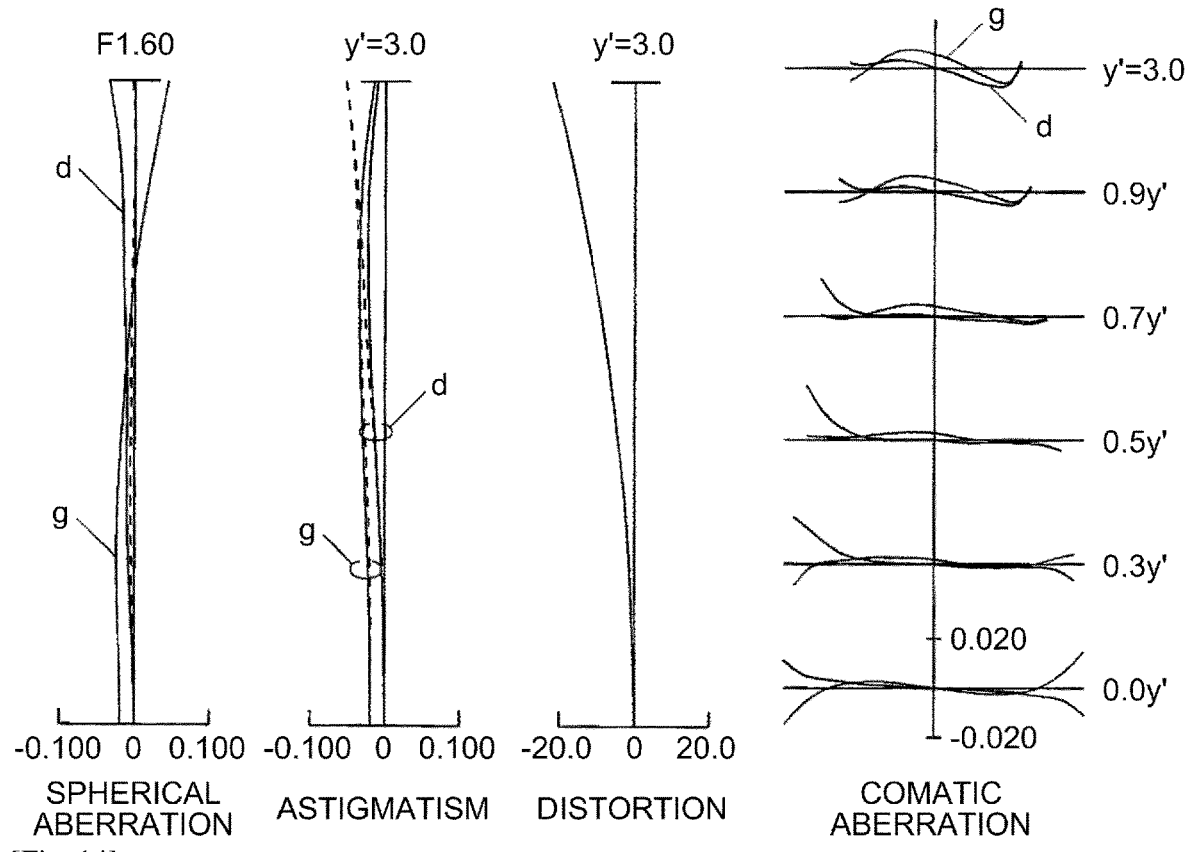
[Fig. 14]
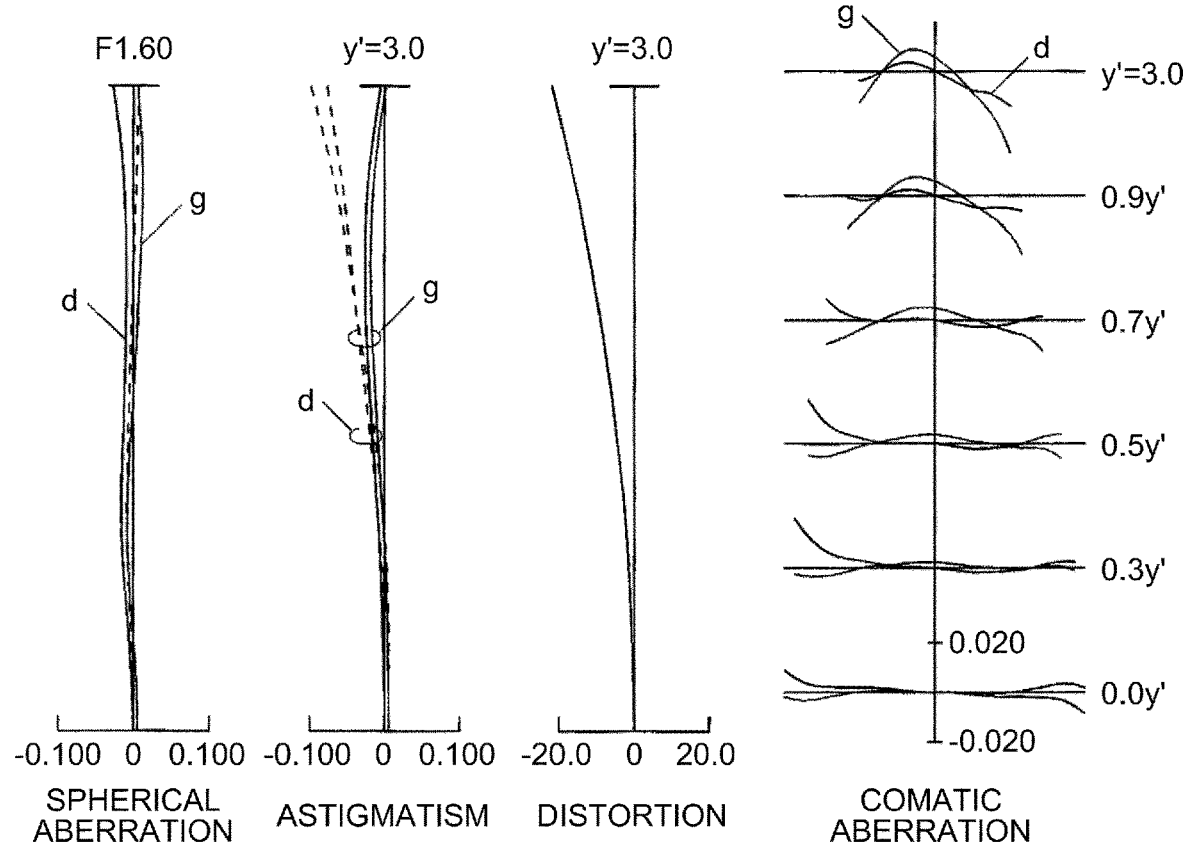

[Fig. 15A]
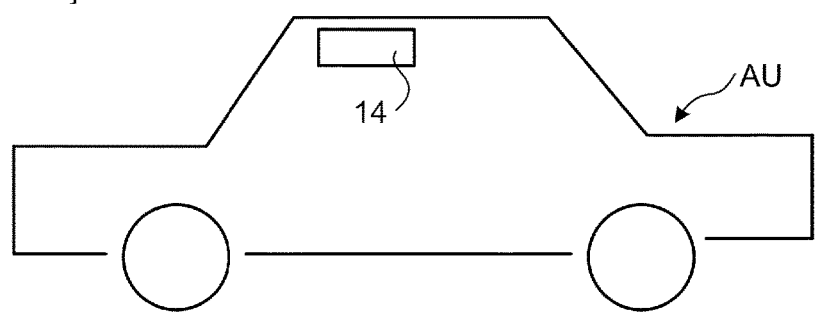
[Fig. 15B]
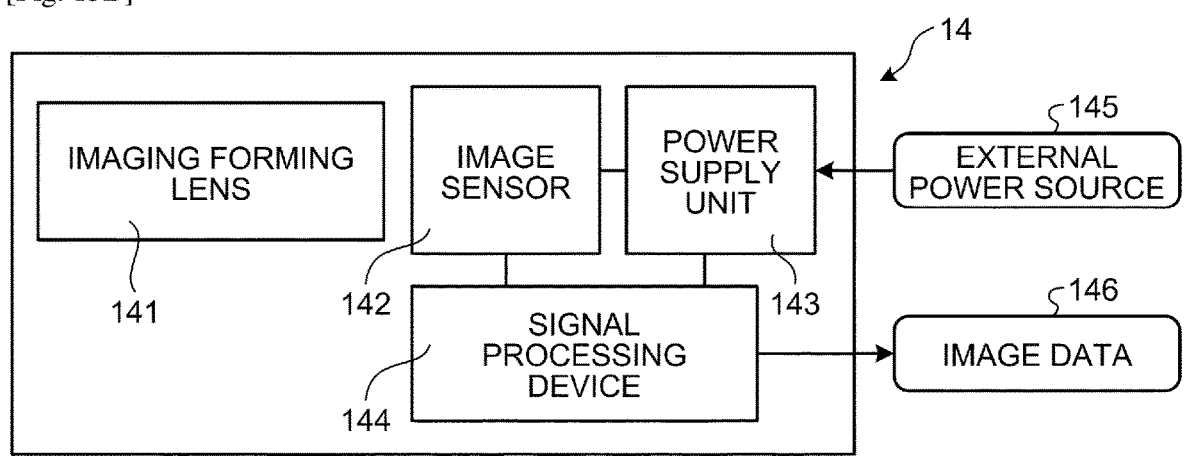

[Fig. 16]
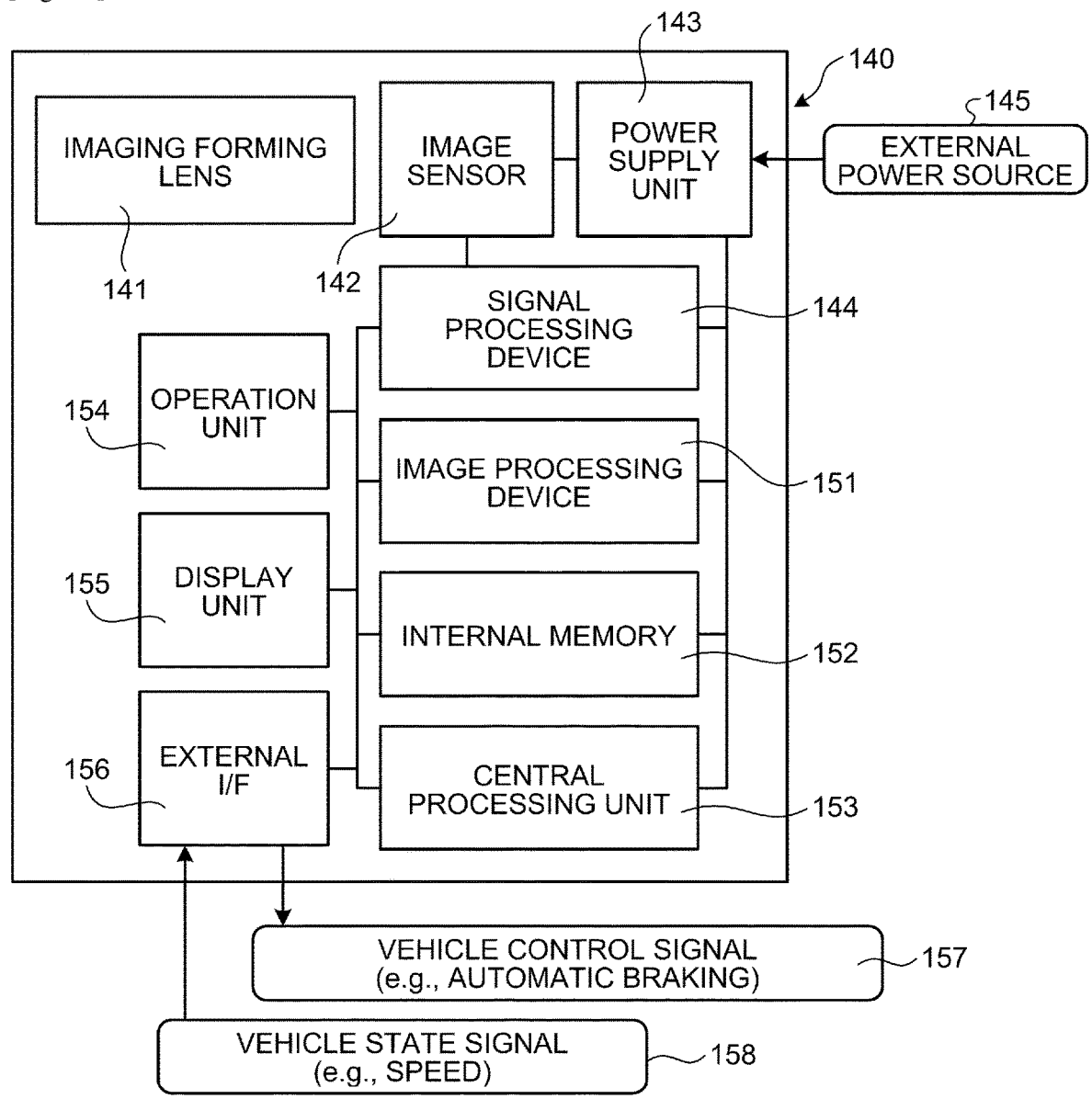

IMAGING OPTICAL SYSTEM AND IMAGING APPARATUS

TECHNICAL FIELD

The present invention relates to an imaging optical system and an imaging apparatus.

BACKGROUND ART

Recently, various types of imaging apparatuses, examples of which include camera apparatuses for capturing images such as digital cameras, and also vehicle-mounted camera apparatuses, stereo camera apparatuses, and monitoring camera apparatuses, have been implemented. Imaging optical systems implemented in these various imaging apparatuses are generally required to be compact, have a certain wide angle of view, and a bright view while having a good performance.

As imaging optical systems including relatively small number of lens elements (e.g., five or six), imaging optical systems disclosed, for example, in Patent Literatures 1 to 3, are known.

The imaging optical systems disclosed in Patent Literatures 1 to 3 have a configuration close to retrofocus with the intention of capturing an image by a solid-state imaging device.

SUMMARY OF INVENTION

Technical Problem

The present invention has an object to implement a novel retrofocus imaging optical system.

Solution to Problem

According to one aspect of the present invention, an imaging optical system includes first to fifth lenses. The first lens has a concave image side surface and has a negative refractive power. The second lens has a convex object side surface and has a positive refractive index. The third lens has a concave object side surface and has a negative refractive power. The fourth lens has a convex image side surface and has a positive refractive power. The fifth lens has a convex object side surface and has a positive refractive power in an order from an object side to an image side. The imaging optical system optionally includes an additional lens on the image side of the fifth lens, and the imaging optical system is configured by six or less lenses in total. The imaging optical system satisfies the following conditional expressions $$1.94 < n2 < 2.20, \text{ and} \quad [1]$$

$$15.0 < v2 < 20.0, \quad [2]$$

where n2 represents a refractive index of a lens material of the second lens at d-line, and v2 represents an Abbe number of the lens material of the second lens at d-line. An Abbe number $\nu$ of a lens material at d-line is defined by $$\nu = (nd-1)/(nF-nC),$$

where nC, nd, and nF represent refractive indices of the lens material at C-line, d-line, and F-line, respectively.

Advantageous Effects of Invention

According to one aspect of the present invention, a novel retrofocus imaging optical system can be implemented.

BRIEF DESCRIPTION OF DRAWINGS

FIG. 1 is a cross-sectional view illustrating a configuration of an imaging optical system according to a first numerical example.

FIG. 2 is a cross-sectional view illustrating a configuration of an imaging optical system according to a second numerical example.

FIG. 3 is a cross-sectional view illustrating a configuration of an imaging optical system according to a third numerical example.

FIG. 4 is a cross-sectional view illustrating a configuration of an imaging optical system according to a fourth numerical example.

FIG. 5 is a cross-sectional view illustrating a configuration of an imaging optical system according to a fifth numerical example.

FIG. 6 is a cross-sectional view illustrating a configuration of an imaging optical system according to a sixth numerical example.

FIG. 7 is a cross-sectional view illustrating a configuration of an imaging optical system according to a seventh numerical example.

FIG. 8 illustrates aberration curves of the imaging optical system according to the first numerical example.

FIG. 9 illustrates aberration curves of the imaging optical system according to the second numerical example.

FIG. 10 illustrates aberration curves of the imaging optical system according to the third numerical example.

FIG. 11 illustrates aberration curves of the imaging optical system according to the fourth numerical example.

FIG. 12 illustrates aberration curves of the imaging optical system according to the fifth numerical example.

FIG. 13 illustrates aberration curves of the imaging optical system according to the sixth numerical example.

FIG. 14 illustrates aberration curves of the imaging optical system according to the seventh numerical example.

FIG. 15A is a diagram illustrating an embodiment of a vehicle-mounted camera apparatus that is an example of an imaging apparatus.

FIG. 15B is a diagram illustrating an embodiment of a vehicle-mounted camera apparatus that is an example of an imaging apparatus.

FIG. 16 is a diagram illustrating an embodiment of a vehicle-mounted sensing apparatus that is an example of the imaging apparatus.

DESCRIPTION OF EMBODIMENTS

Embodiments will be described below.

Seven embodiments of an imaging optical system will be described with reference to FIGS. 1 to 7. These seven embodiments correspond, in this order, to first to seventh examples of the imaging optical system to be described later.

In FIGS. 1 to 7, the left-hand side of the drawing corresponds to the object side, and the right-hand side of the drawing corresponds to the image side.

To avoid complexity, like reference signs are used to refer to like elements in FIGS. 1 to 7.

In FIGS. 1 to 7, a reference sign L1 indicates a first lens, L2 indicates a second lens, a reference sign L3 indicates a third lens, a reference sign L4 indicates a fourth lens, L5 indicates a fifth lens, and a reference sign L6 indicates a sixth lens. A reference sign S indicates an aperture stop. This aperture stop S is located between the second lens L2 and the third lens L3 in each embodiment.

A reference sign Im indicates an image surface of the imaging optical system. In the embodiments illustrated in FIGS. 1 to 7, the imaging optical system is configured to form an image and the image is captured by a solid-state imaging device. A transparent cover glass for protecting a light-receiving surface of the solid-state imaging device is disposed close to and on the object side of the image surface Im. The solid-state imaging device is disposed such that The light-receiving surface of the solid-state imaging device is aligned with the image surface Im.

In FIGS. 1 to 7, a reference sign CG indicates a combination of the cover glass with a certain type of filter such as an infrared cut filter as a single transparent parallel plate equivalent to the combination.

As illustrated in FIGS. 1 to 7, the imaging optical system includes the first lens L1, the second lens L2, the third lens L3, the fourth lens L4, and the fifth lens L5 in this order from the object side to the image side.

The imaging optical system according to the present invention includes the first to the fifth lenses L1 to L5 as a basic lens arrangement of the system, and may also include an additional lens element as a sixth lens L6 on the image side of the fifth lens L5 as illustrated in an embodiment illustrated in FIG. 4.

In other words, the imaging optical system according to the present invention includes five lenses, the first to the fifth lenses L1 to L5, and may include an additional lens (sixth lens L6) on the image side of the fifth lens L5, and thus is configured by six or less lenses in total.

As illustrated in FIGS. 1 to 7, the first lens L1 has a concave image side surface and has a negative refractive power.

The second lens L2 has a convex object side surface and has a positive refractive index.

The third lens L3 has a concave object side surface and has a negative refractive power.

The fourth lens L4 has a convex image side surface and has a positive refractive power.

The fifth lens has a convex object side surface and has a positive refractive power.

The sixth lens L6 illustrated in FIG. 4 is a negative meniscus lens with a concave object side surface, and is cemented with the fifth lens L5.

The sixth lens L6 illustrated in FIG. 4 is an example, and the shape of the sixth lens L6 is not limited to the shape illustrated in FIG. 4. Other than the above-described negative meniscus lens, the sixth lens L6 may be any negative lens such as a biconcave or plano-concave lens, and is not limited to negative lenses and may be any positive lens such as a biconvex lens, a plano-convex lens, or a positive meniscus lens. The sixth lens L6 may be configured to be not cemented with the fifth lens L5.

In the imaging optical system according to the present invention, the lens material of the second lens L2 having a convex object side surface and a positive refractive index satisfies the following conditional expressions:

$$1.94 < n_2 < 2.20; \text{ and} \quad [1]$$

$$15.0 < v_2 < 20.0, \quad [2]$$

where a parameter $n_2$ in conditional expression [1] represents the refractive index of the lens material (glass) of the second lens L2 at d-line, and a parameter $v_2$ represents the Abbe number of the lens material of the second lens L2 at d-line.

The Abbe number v at d-line is defined by the following formula:

$$v = (n_d - 1)/(n_F - n_C),$$

where $n_C$, $n_d$, $n_F$ represent refractive indices of the lens material at C-, d-, and F-lines, respectively.

As described above, the imaging optical system according to the present invention has the retrofocus type power arrangement based on the arrangement in which negative lens, positive lens, negative lens, positive lens, and positive lens are arranged in this order from the object side to the image side.

The four lenses from the second lens L2 to the fifth lens L5 provide a main image forming effect of this imaging optical system. These four positive, negative, positive, and positive lenses have a lens design of what is called the inverse-Ernostar type. Such a lens design allows the imaging optical system to have a degree of freedom for basic aberration correction.

In addition, placing the first lens L1 on the object side of the lens system having the inverse-Ernostar type lens design and adding a negative refractive power thereto can enhance the characteristics of a retrofocus lens type, and allows the system to have a sufficiently wide angle of view.

When an imaging optical system is use for image-capturing by a solid-state imaging device (image sensor), it is required to secure a sufficient exit pupil distance so that incident light rays enter the light-receiving surface at a small incident angle. The above-described lens design can sufficiently satisfy such a requirement.

Aberrations are suitably compensated between the concave image side surface of the first lens L1 and the convex object side surface of the second lens L2, and likewise, aberrations are suitably compensated between the concave object side surface of the third lens L3 and the convex image side surface of the fourth lens L4, which results in reducing the overall aberrations of the system.

The object side surface of the fifth lens L5 is made to be the convex surface to prevent large aberrations, and the balance between residual aberrations is suitably controlled, which results in the basic lens arrangement that can achieve a good image-forming performance of the entire lens system.

Using an optical material that satisfies conditional expressions [1] and [2] for the second lens L2 can sufficiently prevent the occurrence of field curvature and chromatic aberration, and enables both improvement of the performance and increase of the size of the aperture.

If the parameter $n_2$ in conditional expression [1] is 1.94 or less, the positive refractive power of the second lens L2 is not sufficient enough to fully prevent field curvature. Thus, achieving a high resolution from the center to the peripheral may be difficult, in the light of a shallow depth-of-field of a large-aperture lens having an F-number of 1.6.

If the parameter $n_2$ in conditional expression [1] is the upper limit value of 2.20 or more, an optical material having such a parameter value is substantially non-existent, or, if existent, is expensive or has a problem in processability and is inadequate for practical use.

If the parameter $v_2$ in conditional expression [2] is 15.0 or less, correction of the longitudinal chromatic aberration tends to be insufficient or a positive lateral chromatic aberration tends to be left at a shorter wavelength, which makes it difficult to reduce color fringing of an image.

If the parameter $v_2$ in conditional expression [2] is the upper limit value of 20.0 or more, overcorrection of the longitudinal chromatic aberration tends to occur or a negative lateral chromatic aberration tends to be left at a shorter wavelength, which also makes it difficult to reduce or eliminate color fringing of an image. In this basic lens arrangement as discussed above, using an optical material that satisfies conditional expressions [1] and [2] for the second lens L2 can achieve a wide-angle, large-aperture, compact, high-performance lens system.

Preferably, the imaging optical system according to the present invention satisfies at least any one of conditional expressions described below in addition to conditional expressions [1] and [2] above.

$$1.20 < f_2/f < 2.20 \quad [4]$$

$$-0.25 < f/f_{12} < 0.00 \quad [5]$$

$$0.10 < D_{4-5}/f < 0.35 \quad [6]$$

$$-1.4 < r_{31}/f < -0.6 \quad [8]$$

$$0.7 < r_{31}/r_{42} < 1.0 \quad [9]$$

$$3.2 < L/f < 4.2 \quad [10]$$

$$30 < \theta_{max} < 40 \quad [11]$$

Signs in the parameters of the conditional expressions above represent the following meaning.

f is the focal length (>0) of the entire imaging optical system.

$f_2$ is the focal length (>0) of the second lens.

$f_{12}$ is a combined focal length of the first and the second lenses.

$D_{4-5}$ is a distance from the image side surface of the second lens to the object side surface of the third lens.

$r_{31}$ is the radius of curvature of the (concave) object side surface of the third lens.

$r_{42}$ is the radius of curvature of the image side surface of the fourth lens.

L is the length (total length) from the object side surface of the first lens to the image surface of the imaging optical system.

$\theta_{max}$ is the maximum half angle of view (in units of degrees) of the imaging optical system.

The focal length f of the entire imaging optical system is the focal length when focused on infinity if the focal length f changes by focusing.

The second lens has, as discussed above, a convex object side surface. The second lens may have a convex or concave image side surface. When the second lens has a concave image side surface, the imaging optical system preferably satisfies the following conditional expression in addition to conditional expressions [1] and [2]:

$$0.00 < f/r_{22} < 0.40, \quad [3]$$

where $r_{22}$ (<0) represents the radius of curvature of this concave surface, and f represents the focal length of the entire system. Alternatively, the imaging optical system preferably satisfies conditional expressions [1], [2], and [3], and at least any one of conditional expressions [4], [5], [6], [8], [9], [10], and [11].

The first lens has a concave image side surface, and may have a convex or concave object side surface. When the first lens has a concave object side surface, the imaging optical system preferably satisfies the following conditional expression in addition to conditional expressions [1] and [2]:

$$-10.0 < r_{11}/f < -1.0, \quad [7]$$

where $r_{11}$ (<0) represents the radius of curvature of this concave surface, and f represents the focal length of the entire system. Alternatively, the imaging optical system preferably satisfies conditional expressions [1], [2], and [7], and at least any one of conditional expressions [3], [4], [5], [6], [8], [9], [10], and [11].

The meaning of the conditional expressions above will be described below.

If a parameter $f/r_{22}$ in conditional expression [3] is the lower limit value of 0.00 or less, inward comatic aberration tends to occur. If $f/r_{22}$ is the upper limit value of 4.00 or more, outward comatic aberration tends to occur.

Conditional expression [4] provides a suitable range of the refractive power of the second lens relative to the refractive power of the entire system. If the parameter $f_2/f$ is the lower limit value of 1.20 or less, the second lens has an excessive refractive power, and thus a larger aberration tends to occur. To correct this aberration, the first lens is required to have a greater negative refractive power, which leads to overcompensation for the aberration between the first and the second lenses. Consequently, production errors such as relative eccentricity tend to occur, which leads to degraded optical performance.

If the parameter $f_2/f$ is the upper limit value of 2.20 or more, the second lens has an insufficient positive refractive power. This insufficiency can cause difficulty in fully correcting the field curvature or correcting monochromatic and chromatic aberrations, even if the second lens satisfies conditional expressions [1] and [2].

Conditional expression [5] provides a suitable range of the combined refractive power of the first and the second lenses that configure a partial system of the imaging optical system. The first lens has a negative refractive power and the second lens has a positive refractive power, and thus, the refractive power of this partial system can be positive or negative depending on the magnitude correlation between the refractive powers of the first and the second lenses.

If a parameter $f_{12}/f$ is the lower limit value of −0.25 or less, the partial system has an excessive negative refractive power, and astigmatism or outward comatic aberration tends to occur.

If the parameter $f_{12}/f$ is the upper limit value of 0.00 or more, inward comatic aberration tends to occur.

Conditional expression [6] provides a suitable range of the distance between the second lens and the third lens.

If a parameter $D_{4-5}/f$ is the lower limit value of 0.10 or less, the distance $D_{4-5}$ from the image side surface of the second lens to the object side surface of the third lens is insufficient and thus a refractive power of an air lens between the second and the third lenses tends to be insufficient, which tends to cause, for example, the increase of field curvature.

If the parameter $D_{4-5}/f$ is the upper limit value of 0.35 or more, the distance $D_{4-5}$ between the second lens and the third lens is too large, which tends to make it difficult to reduce the size of the imaging optical system.

Conditional expression [7] provides, if the first lens has a concave object side surface, a suitable range of a radius of curvature $r_{11}$ (<0) of a concave surface. If a parameter $r_{11}/f$ is the lower limit value of −10.0 or less, the negative refractive power of the object side surface of the first lens is so weak that spherical aberration or comatic aberration tends to increase. With this condition, the radius of curvature of the first surface of the imaging optical system becomes closer to infinity, and thus, reflected light from the solid-state imaging device is reflected on the first surface so that ghost light tends to concentrate near the image surface.

If the parameter $r_{11}/f$ is the upper limit value of −1.0 or more, the negative refractive power of the object side surface of the first lens is too large, and negative distortion or astigmatism tends to occur.

Conditional expression [8] provides a suitable range of a radius of curvature $r_{31}$ (<0) of the (concave) object side surface of the third lens.

To suitably correct the aberrations of the entire imaging optical system, the object side surface of the third lens preferably has a relatively greater negative refractive power.

If a parameter $r_{31}/f$ is the lower limit value of −1.4 or less, the curvature of the object side surface of the third lens becomes too small to provide a sufficient negative refractive power. Such an insufficient negative refractive power of the object side surface of the third lens tends to lead to, in particular, insufficient correction of field curvature.

If the parameter $r_{31}/f$ is the upper limit value of −0.6 or more, the curvature of the object side surface of the third lens becomes large and the negative refractive power of this object side surface becomes excessive, and thus, higher order aberrations that cannot be corrected tend to occur. Moreover, degradation in optical performance due to a production error tends to occur.

Conditional expression [9] provides a suitable relation between the shape of a partial system including the third lens and the fourth lens.

In the imaging optical system according to the above-described embodiments of the present invention, aberrations are suitably compensated between the concave image side surface of the first lens and the convex object side surface of the second lens, and likewise, aberrations are suitably compensated between the concave object side surface of the third lens and the convex image side surface of the fourth lens, to reduce the overall aberrations of the system.

If a parameter $r_{31}/r_{42}$ is the lower limit value of 0.7 or less, the negative refractive power of the concave object side surface of the third lens becomes excessive relative to the positive refractive power of the image side surface of the fourth lens, which tends to increase astigmatism or cause inward comatic aberration.

If the parameter $r_{31}/r_{42}$ is the upper limit value of 1.0 or more, the negative refractive power of the concave object side surface of the third lens becomes insufficient relative to the positive refractive power of the image side surface of the fourth lens, which tends to make it difficult to reduce field curvature or cause outward comatic aberration.

Conditional expressions [10] and [11] provide a suitable total length and angle of view of the imaging optical system, respectively, that tends to cause the advantage of the present invention to appear.

In other words, the imaging optical system according to the present invention can achieve more favorable performance with a total length L that satisfies conditional expression [10] and a maximum half angle of view $\theta_{max}$ that satisfies conditional expression [11].

Conditional expression [4] has been described to provide a suitable range of the refractive power of the second lens. Preferably, the refractive powers of the first, third, fourth, and fifth lenses satisfy the following conditional expressions:

$$-1.4 < f_1/f < 1.0; \quad [12]$$

$$-1.0 < f_3/f < -0.4; \quad [13]$$

$$0.6 < f_4/f < 1.5; \text{ and} \quad [14]$$

$$1.1 < f_5/f < 1.6, \quad [15]$$

where $f_1$ represents the focal length of the first lens, $f_3$ represents the focal length of the third lens, $f_4$ represents the focal length of the fourth lens, and $f_5$ represents the focal length of the fifth lens.

Using the lenses having refractive powers that satisfy conditional expressions [12] to [15] can more suitably configure a compact imaging optical system having a half angle of view of about 30 to 40 degrees and an F-number of about 1.6.

For better aberration correction, an aspheric surface is preferably provided around the fifth lens. This configuration is highly advantageous in correcting spherical aberration, comatic aberration, astigmatism, and distortion.

The following briefly describes an example of a vehicle-mounted camera apparatus and a vehicle-mounted sensing apparatus as embodiments of an imaging apparatus using the imaging optical system as an image acquisition optical system, before describing specific examples of the imaging optical system.

FIGS. 15A and 15B are schematic diagrams illustrating an embodiment of a vehicle-mounted camera apparatus.

In FIG. 15A, a reference sign 14 indicates an imaging apparatus that is a vehicle-mounted camera apparatus mounted on a vehicle AU to acquire image information outside the vehicle.

FIG. 15B is a system diagram of the vehicle-mounted camera apparatus 14.

An imaging forming lens 141 is the imaging optical system that is an image acquisition optical system. The imaging optical system according to any one of claims 1 to 9 of the present invention, specifically, according to any one of first to seventh numerical examples to be described later can be used as the imaging forming lens 141.

An optical image of a subject formed by the imaging forming lens 141 that is the imaging optical system is converted into an electric signal by an image sensor 142, and then the electric signal is converted into image data 146 by a signal processing device 144 and the data is output to the outside.

The power necessary for system operation is supplied from an external power source 145 to a power supply unit 143, and through the power supply unit 143, the power is shared by the image sensor 142 and the signal processing device 144.

The image data 146 output to the outside can be displayed to the driver by a mechanical device (not illustrated) such as a rear view monitor, and/or recorded by an event data recorder, for example.

FIG. 16 is a system diagram of a vehicle-mounted sensing apparatus 140 that is an embodiment of the imaging apparatus. The vehicle-mounted camera apparatus 14 illustrated in FIGS. 15A and 15B is used for this embodiment, and thus, like reference signs in FIGS. 15A and 15B are used to refer to like elements if there may be no confusion.

An optical image of a subject formed by the imaging forming lens 141 that is the imaging optical system is converted into an electric signal by the image sensor 142, and the electric signal is converted into image data by the signal processing device 144. In the same manner as the vehicle-mounted camera apparatus 14 illustrated in FIGS. 15A and 15B, the vehicle-mounted sensing apparatus 140 can use the imaging optical system according to any one of claims 1 to 9 of the present invention, specifically, according to any one of the first to seventh numerical examples to be described later as the imaging forming lens 141. This image data is subjected to image processing by an image processing device 151 in accordance with the purpose. After image processing, various types of sensing information is extracted from the processed image. Examples of the sensing information include distance information between the vehicle AU and nearby vehicles, recognition information of the cursing lane, recognition information of traffic signals, and detection information of pedestrians. The sensing information is extracted using software that runs on a central processing unit 153. Part or all of the software may be implemented by hardware such as a field programmable gate array (FPGA) or an application specific integrated circuit (ASIC). The image after image processing by the image processing device 151 and/or various types of extracted sensing information are temporarily or semi-permanently stored in an internal memory 152. The vehicle-mounted sensing apparatus 140 has an external I/F 156 that is an interface connecting to the outside, and can acquire vehicle state signals indicating information such as speed and acceleration.

Based on the vehicle state signals and the above-described various types of sensing information, the software that runs on the central processing unit 153 performs necessary determination operation for automatic drive or for avoiding danger. A vehicle control signal 157 based on the result of this determination operation is output to mechanical devices (not illustrated), and the mechanical devices perform, for example, steering, deceleration, and acceleration, and issues visual and/or audible warning to the driver.

The vehicle-mounted sensing apparatus includes an operation unit 154 and a display unit 155 with which the user can change setting and by which information for the user can be displayed.

The operation unit 154 and the display unit 155 may be directly mounted to the vehicle-mounted sensing apparatus, may be provided as an operating unit and a display unit of another mechanical device (not illustrated) separate from the vehicle-mounted sensing apparatus, or may be shared with an operation unit and a display unit provided for other purposes.

A sensing system that uses the various sensing information detected by the above-described vehicle-mounted sensing apparatus together with sensing information detected by other sensing apparatuses such as a laser radar, a millimeter wave radar, and an infrared camera, may be implemented.

NUMERICAL EXAMPLES

The following specifically describes seven numerical examples of the imaging optical system. The maximum imaged height in all the numerical examples is 3 mm.

In each numerical example, the parallel plate, which is indicated by the reference sign CG in FIGS. 1 to 7, disposed closest to the image surface is assumed to be a filter that blocks ultraviolet rays or infrared rays, or a sealing glass (covering glass) provided in a CMOS image sensor or the like. In the following numerical examples, the parallel plate CG is disposed such that its image side surface is about 0.5 mm away from the image surface, which is indicated by the reference sign Im in FIGS. 1 to 7, to the object side, but the position of the parallel plate CG is not limited to this. Although a single parallel plate CG is illustrated, a plurality of filters or covering glasses may be individually disposed.

Signs in the numerical examples represent the following meaning.

f: Focal length of entire imaging optical system
F: F-number
ω: Half angle of view
R: Radius of curvature
D: Distance between surfaces
$N_d$: Refractive index at d-line
$v_d$: Abbe number at d-line
$\theta_{g,F}$: Partial dispersion ratio of lens material
Partial dispersion ratio $\theta_{g,F}$ is defined by the following equation:

$$\theta_{g,F} = (n_g - n_F)/(n_F - n_C),$$

where $n_g$, $n_F$, and $n_C$ represent refractive indices of the lens material at g-, F-, and C lines, respectively.

K: Conic constant of aspheric surface
$A_4$: 4th order aspheric coefficient
$A_6$: 6th order aspheric coefficient
$A_8$: 8th order aspheric coefficient
$A_{10}$: 10th order aspheric coefficient
$A_{12}$: 12th order aspheric coefficient
$A_{14}$: 14th order aspheric coefficient "Surface number" is a number of a surface counted from the object side, and surfaces include the surface of the aperture stop.

An aspheric surface X is given by the following known equation;

$$X = CH^2/[1+\sqrt{\{1-(1+K)C^2H^2\}}] + A_4 \cdot H^4 + A_6 \cdot H^6 + A_8 \cdot H^8 + A_{10} \cdot H^{10} + A_{12} \cdot H^{12} + A_{14} \cdot H^{14}$$

using the reciprocal of a paraxial radius of curvature R (a paraxial curvature C), a radial distance H from the optical axis, and the aforementioned aspheric coefficients, and R, K, and $A_4$ to $A_{14}$ are given to specify the shape.

The dimension of length is measured in mm unless otherwise specified.

First Numerical Example

A first numerical example relates to the imaging optical system illustrated in FIG. 1. Data of the first numerical example is as follows.
f = 5.52, F = 1.60, ω = 34.8

| Surface number | R | D | $N_d$ | $v_d$ | $\theta_{g,F}$ | Glass type name |
|---|---|---|---|---|---|---|
| 01 | −16.000 | 0.75 | 1.61800 | 63.33 | 0.5441 | OHARA S-PHM52 |
| 02 | 5.713 | 0.88 | | | | |
| 03 | 7.670 | 1.59 | 2.10420 | 17.02 | 0.6631 | HOYA E-FDS3 |
| 04 | 36.715 | 0.40 | | | | |
| 05 | Stop | 0.80 | | | | |
| 06 | −4.560 | 0.88 | 1.84666 | 23.78 | 0.6205 | OHARA S-TIH53 |
| 07 | 5.693 | 2.95 | 1.71700 | 47.93 | 0.5605 | OHARA S-LAM3 |
| 08 | −5.693 | 0.15 | | | | |
| 09* | 7.044 | 2.49 | 1.53775 | 74.70 | 0.5392 | OHARA S-FPM3 |

-continued

A first numerical example relates to the imaging optical system illustrated in FIG. 1. Data of the first numerical example is as follows.
f = 5.52, F = 1.60, ω = 34.8

| | | | | | |
|---|---|---|---|---|---|
| 10 | −9.000 | 7.779 | | | |
| 11 | ∞ | 0.70 | 1.51633 | 64.14 | Filter, etc. |
| 12 | ∞ | | | | |

K Aspheric Surface Data
An aspheric surface is indicated by a surface number with *.
This is applicable to the following numerical examples.
Aspheric surface data is as follows.

Aspheric Surface: The Ninth Surface
$K = 0.0, A_4 = -7.81373 * 10^{-4}, A_6 = -5.96048 * 10^{-5}, A_8 = 1.79239 * 10^{-5},$
$A_{10} = -2.82471 * 10^{-6}, A_{12} = 2.16714 * 10^{-7}, A_{14} = -6.40278 * 10^{-9}$ Values of Parameters in Conditional Expressions
Parameters in conditional expressions [3] to [15] are as follows.
Values of the parameters relating to conditional expressions [1] and [2] are described in the data above. This is applicable to the following numerical examples.

[3] $f/r_{22} = 0.150$
[4] $f_2/f = 1.546$
[5] $f/f_{12} = -0.0967$
[6] $D_{4-5}/f = 0.217$
[7] $r_{11}/f = -2.899$
[8] $r_{31}/f = -0.826$
[9] $r_{31}/r_{42} = 0.801$
[10] $L/f = 3.599$
[11] $θ_{max} = 34.80$
[12] $f_1/f = -1.218$
[13] $f_3/f = -0.521$
[14] $f_4/f = 0.807$
[15] $f_5/f = 1.408$

Second Numerical Example

A second numerical example relates to the imaging optical system illustrated in FIG. 2. Data of the second numerical example is as follows.
f = 5.52, F = 1.60, ω = 34.8

| Surface number | R | D | $N_d$ | $v_d$ | $θ_{g,F}$ | Glass type name |
|---|---|---|---|---|---|---|
| 01 | −15.543 | 0.75 | 1.49700 | 81.54 | 0.5375 | OHARA S-FPL51 |
| 02 | 4.545 | 0.81 | | | | |
| 03 | 6.710 | 1.61 | 1.94595 | 17.98 | 0.6544 | HOYA FDS18 |
| 04 | 28.024 | 0.40 | | | | |
| 05 | Stop | 0.80 | | | | |
| 06 | −4.960 | 0.87 | 1.84666 | 23.78 | 0.6205 | OHARA S-TIH53 |
| 07 | 6.028 | 3.06 | 1.69680 | 55.53 | 0.5434 | OHARA S-LAL14 |
| 08 | −6.028 | 0.15 | | | | |
| 09* | 7.759 | 2.47 | 1.59201 | 67.02 | 0.5367 | HOYA M-PCD51 |
| 10 | −9.044 | 7.754 | | | | |
| 11 | ∞ | 0.70 | 1.51633 | 64.14 | | Filter, etc. |
| 12 | ∞ | | | | | |

Aspheric Surface Data
Aspheric surface data is as follows.

Aspheric Surface: The Ninth Surface
$K = 0.0, A_4 = -6.45155 * 10^{-4}, A_6 = -6.81810 * 10^{-5}, A_8 = 1.96673 * 10^{-5}, A_{10} = -2.95438 * 10^{-6},$
$A_{12} = 2.17055 * 10^{-7}, A_{14} = -6.17785 * 10^{-9}$ Values of Parameters in Conditional Expressions
Parameters in conditional expressions [3] to [15] are as follows.

[3] $f/r_{22} = 0.197$
[4] $f_2/f = 1.630$
[5] $f/f_{12} = -0.117$
[6] $D_{4-5}/f = 0.217$
[7] $r_{11}/f = -2.816$
[8] $r_{31}/f = -0.899$
[9] $r_{31}/r_{42} = 0.823$

-continued

A second numerical example relates to the imaging optical system illustrated in FIG. 2.
Data of the second numerical example is as follows.
f = 5.52, F = 1.60, ω = 34.8

[10] L/f = 3.601
[11] $\theta_{max}$ = 34.80
[12] $f_1/f$ = −1.266
[13] $f_3/f$ = −0.562
[14] $f_4/f$ = 0.875
[15] $f_5/f$ = 1.352

Third Numerical Example

A third numerical example relates to the imaging optical system illustrated in FIG. 3.
Data of the third numerical example is as follows.
f = 5.52, F = 1.60, ω = 34.8

| Surface number | R | D | $N_d$ | $v_d$ | $\theta_{g,F}$ | Glass type name |
|---|---|---|---|---|---|---|
| 01 | −13.864 | 0.75 | 1.60300 | 65.44 | 0.5401 | OHARA S-PHM53 |
| 02 | 5.154 | 0.72 | | | | |
| 03 | 7.419 | 1.64 | 2.00275 | 19.32 | 0.6450 | HOYA E-FDS2 |
| 04 | 130.251 | 0.40 | | | | |
| 05 | Stop | 0.80 | | | | |
| 06 | −5.006 | 1.26 | 1.84666 | 23.78 | 0.6205 | OHARA S-TIH53 |
| 07 | 6.332 | 2.85 | 1.73400 | 51.47 | 0.5486 | OHARA S-LAL59 |
| 08 | −6.332 | 0.15 | | | | |
| 09* | 7.731 | 2.35 | 1.59201 | 67.02 | 0.5367 | HOYA M-PCD51 |
| 10 | −10.281 | 7.756 | | | | |
| 11 | ∞ | 0.70 | 1.51633 | 64.14 | | Filter, etc. |
| 12 | ∞ | | | | | |

Aspheric Surface Data
Aspheric surface data is as follows.

Aspheric Surface: The Ninth Surface
K = 0.0, $A_4$ = −5.74796 * $10^{-4}$, $A_6$ = −5.59976 * $10^{-5}$, $A_8$ = 1.60354 * $10^{-5}$, $A_{10}$ = −2.40130 * $10^{-6}$, $A_{12}$ = 1.76110 * $10^{-7}$, $A_{14}$ = −5.01568 * $10^{-9}$ Values of Parameters in Conditional Expressions
Parameters in conditional expressions [3] to [15] are as follows.

[3] $f/r_{22}$ = 0.0424
[4] $f_2/f$ = 1.411
[5] $f/f_{12}$ = −0.0990
[6] $D_{4-5}/f$ = 0.217
[7] $r_{11}/f$ = −2.511
[8] $r_{31}/f$ = −0.907
[9] $r_{31}/r_{42}$ = 0.791
[10] L/f = 3.599
[11] $\theta_{max}$ = 34.80
[12] $f_1/f$ = −1.112
[13] $f_3/f$ = −0.569
[14] $f_4/f$ = 0.863
[15] $f_5/f$ = 1.419

Fourth Numerical Example

A fourth numerical example relates to the imaging optical system illustrated in FIG. 4.
Data of the fourth numerical example is as follows.
f = 6.02, F = 1.60, ω = 32.4

| Surface number | R | D | $N_d$ | $v_d$ | $\theta_{g,F}$ | Glass type name |
|---|---|---|---|---|---|---|
| 01 | −8.673 | 0.75 | 1.51633 | 64.14 | 0.5353 | OHARA S-BSL7 |
| 02 | 6.551 | 0.60 | | | | |
| 03 | 8.016 | 1.60 | 1.95906 | 17.47 | 0.6598 | OHARA S-NPH3 |
| 04 | 44.256 | 0.50 | | | | |
| 05 | Stop | 0.80 | | | | |

-continued

A fourth numerical example relates to the imaging optical system illustrated in FIG. 4.
Data of the fourth numerical example is as follows.
f = 6.02, F = 1.60, ω = 32.4

| 06  | −6.111  | 1.00 | 1.84666 | 23.78 | 0.6205 | OHARA S-TIH53 |
| 07  | 6.966   | 3.46 | 1.77250 | 49.60 | 0.5520 | OHARA S-LAH66 |
| 08  | −6.966  | 0.15 |         |       |        |               |
| 09* | 7.045   | 2.98 | 1.59201 | 67.02 | 0.5367 | HOYA M-PCD51  |
| 10  | −9.753  | 0.80 | 1.63980 | 34.47 | 0.5922 | OHARA S-TIM27 |
| 11  | −16.577 | 7.430 |        |       |        |               |
| 12  | ∞       | 0.70 | 1.51633 | 64.14 |        | Filter, etc.  |
| 13  | ∞       |      |         |       |        |               |

Aspheric Surface Data
Aspheric surface data is as follows.

Aspheric Surface: The Ninth Surface
K = 0.0, $A_4 = -3.69067 * 10^{-4}$, $A_6 = -6.12964 * 10^{-5}$, $A_8 = 1.26636 * 10^{-5}$, $A_{10} = -1.44535 * 10^{-6}$, $A_{12} = 8.06838 * 10^{-8}$, $A_{14} = -1.75019 * 10^{-9}$ Values of Parameters in Conditional Expressions
Parameters of conditional expressions [3] to [15] are as follows.

[3] $f/r_{22}$ = 0.136
[4] $f_2/f$ = 1.658
[5] $f/f_{12}$ = −0.191
[6] $D_{4-5}/f$ = 0.216
[7] $r_{11}/f$ = −1.439
[8] $r_{31}/f$ = −1.014
[9] $r_{31}/r_{42}$ = 0.877
[10] $L/f$ = 3.530
[11] $\theta_{max}$ = 32.40
[12] $f_1/f$ = −1.180
[13] $f_3/f$ = −0.616
[14] $f_4/f$ = 0.839
[15] $f_5/f$ = 1.228 ($f_{5-6}$ = 1.496)

In the fourth numerical example as illustrated in FIG. 4, a cemented lens made of the fifth lens L5 and the sixth lens L6 is located closest to the image surface. $f_{5-6}$ represents a combined focal length of the cemented lens made of the fifth lens L5 and the sixth lens L6. Conditional expression [15] is satisfied if this cemented lens is considered as a singlet lens.

Fifth Numerical Example

A fifth numerical example relates to the imaging optical system illustrated in FIG. 5.
Data of the fifth numerical example is as follows.
f = 5.52, F = 1.60, ω = 34.8

| Surface number | R | D | $N_d$ | $v_d$ | $\theta_{g,F}$ | Glass type name |
|---|---|---|---|---|---|---|
| 01  | −16.000 | 0.75 | 1.51633 | 64.14 | 0.5353 | OHARA S-BSL7 |
| 02  | 4.477   | 0.82 |         |       |        |              |
| 03  | 6.340   | 1.60 | 1.95906 | 17.47 | 0.6598 | OHARA S-NPH3 |
| 04  | 18.650  | 0.50 |         |       |        |              |
| 05  | Stop    | 0.91 |         |       |        |              |
| 06  | −4.627  | 0.81 | 1.84666 | 23.78 | 0.6205 | OHARA S-TIH53 |
| 07  | 5.535   | 2.64 | 1.72000 | 43.69 | 0.5699 | OHARA S-LAM52 |
| 08  | −5.535  | 0.15 |         |       |        |              |
| 09* | 7.033   | 2.74 | 1.53775 | 74.70 | 0.5392 | OHARA S-FPM3 |
| 10  | −7.980  | 7.755 |        |       |        |              |
| 11  | ∞       | 0.70 | 1.51633 | 64.14 |        | Filter, etc. |
| 12  | ∞       |      |         |       |        |              |

Aspheric Surface Data
Aspheric surface data is as follows.

Aspheric Surface: The Ninth Surface
K = 0.0, $A_4 = -9.15169 * 10^{-4}$, $A_6 = -6.14529 * 10^{-5}$, $A_8 = 2.02861 * 10^{-5}$, $A_{10} = -3.34745 * 10^{-6}$, $A_{12} = 2.61322 * 10^{-7}$, $A_{14} = -7.73403 * 10^{-9}$ Values of Parameters in Conditional Expressions
Parameters in conditional expressions [3] to [15] are as follows.

[3] $f/r_{22}$ = 0.296
[4] $f_2/f$ = 1.707
[5] $f/f_{12}$ = −0.192
[6] $D_{4-5}/f$ = 0.256

-continued

A fifth numerical example relates to the imaging optical system illustrated in FIG. 5.
Data of the fifth numerical example is as follows.
f = 5.52, F = 1.60, ω = 34.8

[7] $r_{11}/f$ = −2.900
[8] $r_{31}/f$ = −0.839
[9] $r_{31}/r_{42}$ = 0.836
[10] $L/f$ = 3.602
[11] $θ_{max}$ = 34.80
[12] $f_1/f$ = −1.213
[13] $f_3/f$ = −0.520
[14] $f_4/f$ = 0.836
[15] $f_5/f$ = 1.346

Sixth Numerical Example

A sixth numerical example relates to the imaging optical system illustrated in FIG. 6.
Data of the sixth numerical example is as follows.
f = 5.03, F = 1.60, ω = 37.3

| Surface number | R | D | $N_d$ | $v_d$ | $θ_{g,F}$ | Glass type name |
|---|---|---|---|---|---|---|
| 01 | −33.941 | 0.75 | 1.61800 | 63.33 | 0.5441 | OHARA S-PHM52 |
| 02 | 4.196 | 1.38 | | | | |
| 03 | 7.169 | 1.58 | 1.95906 | 17.47 | 0.6598 | OHARA S-NPH3 |
| 04 | 31.066 | 0.54 | | | | |
| 05 | Stop | 0.90 | | | | |
| 06 | −4.526 | 0.80 | 1.84666 | 23.78 | 0.6205 | OHARA S-TIH53 |
| 07 | 8.698 | 2.37 | 1.73400 | 51.47 | 0.5486 | OHARA S-LAL59 |
| 08 | −5.748 | 0.15 | | | | |
| 09* | 7.219 | 2.48 | 1.53775 | 74.70 | 0.5392 | OHARA S-FPM3 |
| 10* | −7.211 | 7.755 | | | | |
| 11 | ∞ | 0.70 | 1.51633 | 64.14 | | Filter, etc. |
| 12 | ∞ | | | | | |

Aspheric Surface Data
Aspheric surface data is as follows.

Aspheric Surface: The Ninth Surface
K = 0.0, $A_4$ = −7.61483 * $10^{-4}$, $A_6$ = −6.66140 * $10^{-5}$, $A_8$ = 1.84204 * $10^{-5}$, $A_{10}$ = −2.63382 * $10^{-6}$, $A_{12}$ = 1.80029 * $10^{-7}$, $A_{14}$ = −4.89368 * $10^{-9}$
Aspheric Surface: The Tenth Surface
K = 0.0, $A_4$ = 5.05841 * $10^{-4}$, $A_6$ = 8.42039 * $10^{-6}$, $A_8$ = −8.96945 * $10^{-7}$ Values of Parameters in Conditional Expressions
Parameters in conditional expressions [3] to [15] are as follows.

[3] $f/r_{22}$ = 0.162
[4] $f_2/f$ = 1.872
[5] $f/f_{12}$ = −0.198
[6] $D_{4-5}/f$ = 0.286
[7] $r_{11}/f$ = −6.731
[8] $r_{31}/f$ = −0.900
[9] $r_{31}/r_{42}$ = 0.787
[10] $L/f$ = 3.950
[11] $θ_{max}$ = 37.33
[12] $f_1/f$ = −1.193
[13] $f_3/f$ = −0.681
[14] $f_4/f$ = 1.008
[15] $f_5/f$ = 1.420

Seventh Numerical Example

A seventh numerical example relates to the imaging optical system illustrated in FIG. 7.
Data of the seventh numerical example is as follows.
f = 5.53, F = 1.60, ω = 34.8

| Surface number | R | D | $N_d$ | $v_d$ | $\theta_{g,F}$ | Glass type name |
|---|---|---|---|---|---|---|
| 01 | −13.833 | 0.75 | 1.60562 | 43.71 | 0.5721 | OHARA S-BAM4 |
| 02 | 5.555 | 1.05 | | | | |
| 03 | 9.028 | 2.02 | 2.10420 | 17.02 | 0.6631 | HOYA E-FDS3 |
| 04 | 139.933 | 1.00 | | | | |
| 05 | Stop | 0.80 | | | | |
| 06 | −5.078 | 0.90 | 1.92286 | 18.90 | 0.6495 | OHARA S-NPH2 |
| 07 | 34.127 | 0.30 | | | | |
| 08 | 30.853 | 2.08 | 1.77250 | 49.60 | 0.5520 | OHARA S-LAH66 |
| 09 | −6.452 | 0.16 | | | | |
| 10* | 7.420 | 2.33 | 1.55332 | 71.68 | 0.5402 | HOYA M-FCD500 |
| 11* | −9.581 | 7.790 | | | | |
| 12 | ∞ | 0.70 | 1.51633 | 64.14 | | Filter, etc. |
| 13 | ∞ | | | | | |

Aspheric Surface Data
Aspheric surface data is as follows.

Aspheric Surface: The Tenth Surface
$K = 0.0$, $A_4 = -3.92559 * 10^{-4}$, $A_6 = -1.01625 * 10^{-4}$, $A_8 = 2.38570 * 10^{-5}$, $A_{10} = -3.02537 * 10^{-6}$, $A_{12} = 2.00360 * 10^{-7}$, $A_{14} = -5.27476 * 10^{-9}$
Aspheric Surface: The Eleventh Surface
$K = 0.0$, $A_4 = 5.33338 * 10^{-4}$, $A_6 = -7.25276 * 10^{-6}$, $A_8 = 8.72524 * 10^{-7}$ Values of Parameters in Conditional Expressions
Parameters in conditional expressions [3] to [15] are as follows.

[3] $f/r_{22} = 0.0395$
[4] $f_2/f = 1.569$
[5] $f/f_{12} = -0.109$
[6] $D_{4-5}/f = 0.326$
[7] $r_{11}/f = -2.504$
[8] $r_{31}/f = -0.919$
[9] $r_{31}/r_{42} = 0.787$
[10] $L/f = 3.689$
[11] $\theta_{max} = 34.77$
[12] $f_1/f = -1.167$
[13] $f_3/f = -0.857$
[14] $f_4/f = 1.281$
[15] $f_5/f = 1.438$ FIGS. 8 to 14 are diagrams illustrating aberration curves of the imaging optical system according to the first to seventh numerical examples, respectively. In these aberration curves, dashed line in a diagram illustrating spherical aberration represents sine condition, solid line in a diagram illustrating astigmatism represents sagittal astigmatism and dashed line therein represents meridional astigmatism.

As illustrated in the diagrams of aberration curves, aberrations in the numerical examples are well corrected, and thus the imaging optical system exhibits high imaging performance. The imaging optical system according to any one of the numerical examples, which has a wide half angle of view of about 30 to 40 degrees and has a large aperture with an F-number of about 1.6, achieves sufficient compactness and high resolution.

As described above, according to the present invention, a novel retrofocus imaging optical system and an imaging apparatus including the imaging optical system as an image acquisition optical system can be implemented.

(1)
An imaging optical system including: a first lens (L) having a concave image side surface and having a negative refractive power; a second lens (L2) having a convex object side surface and having a positive refractive index; a third lens (L3) having a concave object side surface and having a negative refractive power; a fourth lens (L4) having a convex image side surface and having a positive refractive power; and a fifth lens (L5) having a convex object side surface and having a positive refractive power in an order from an object side to an image side, the imaging optical system optionally including an additional lens on the image side of the fifth lens (L5), the imaging optical system being configured by six or less lenses in total, the imaging optical system satisfying the following conditional expressions:

$$1.94 < n_2 < 2.20; \text{ and} \qquad [1]$$

$$15.0 < v_2 < 20.0, \qquad [2]$$

where $n_2$ represents a refractive index of a lens material of the second lens at d-line, and $v_2$ represents an Abbe number of the lens material of the second lens at d-line, an Abbe number $v$ of a lens material at d-line being defined by $$v = (n_d - 1)/(n_F - n_C),$$

where $n_C$, $n_d$, and $n_F$ represent refractive indices of the lens material at C-line, d-line, and F-line, respectively (first to seventh examples).

(2)

The imaging optical system according to (1), wherein the second lens (L2) has a concave image side surface, and the imaging optical system satisfies the following conditional expression:

$$0.00 < f/r_{22} < 0.40, \quad [3]$$

where f represents a focal length of the entire imaging optical system, and $r_{22}$ represents a radius of curvature of the image side surface of the second lens (first to seventh examples).

(3)

The imaging optical system according to (1) or (2), wherein the imaging optical system satisfies the following conditional expression:

$$1.20 < f_2/f < 2.20, \quad [4]$$

where f represents a focal length of the entire imaging optical system and $f_2$ represents a focal length of the second lens (L2) (first to seventh examples).

(4)

The imaging optical system according to any one of (1) to (3), wherein the imaging optical system satisfies the following conditional expression:

$$-0.25 < f/f_{12} < 0.00, \quad [5]$$

where f represents a focal length of the entire imaging optical system, and $f_{12}$ represents a combined focal length of the first lens (L) and the second lens (L2) (first to seventh examples).

(5)

The imaging optical system according to any one of (1) to (4), wherein the imaging optical system satisfies the following conditional expression:

$$0.10 < D_{4-5}/f < 0.35, \quad [6]$$

where f represents a focal length of the entire imaging optical system, and $D_{4-5}$ represents a distance from an image side surface of the second lens (L2) to the object side surface of the third lens (first to seventh examples).

(6)

The imaging optical system according to any one of (1) to (5), wherein the first lens has a concave object side surface, and the imaging optical system satisfies the following conditional expression:

$$-10.0 < r_{11}/f < -1.0, \quad [7]$$

where $r_{11}$ represents a radius of curvature of the concave object side surface of the first lens (L), and f represents a focal length of the entire imaging optical system (first to seventh examples).

(7)

The imaging optical system according to any one of (1) to (6), wherein the imaging optical system satisfies the following conditional expression:

$$-1.4 < r_{31}/f < -0.6, \quad [8]$$

where f represents a focal length of the entire imaging optical system, and $r_{31}$ represents a radius of curvature of the concave object side surface of the third lens (L3) (first to seventh examples).

(8)

The imaging optical system according to any one of (1) to (7), wherein the imaging optical system satisfies the following conditional expression:

$$0.7 < r_{31}/r_{42} < 1.0, \quad [9]$$

where $r_{31}$ represents a radius of curvature of the concave object side surface of the third lens (L3), and $r_{42}$ represents a radius of curvature of the convex image side surface of the fourth lens (L4) (first to seventh examples).

(9)

The imaging optical system according to any one of (1) to (8), wherein the imaging optical system satisfies the following conditional expressions:

$$3.2 < L/f < 4.2; \text{ and} \quad [10]$$

$$30 < \theta_{max} < 40, \quad [11]$$

where f represents a focal length of the entire imaging optical system, L represents a length from an object side surface of the first lens (L) to an image surface of the imaging optical system, and $\theta_{max}$ (in units of degrees) represents a maximum half angle of view of the imaging optical system (first to seventh examples).

(10)

An imaging apparatus including the imaging optical system according to any one of (1) to (9) as an image acquisition optical system (FIGS. 15 and 16).

While preferred embodiments of the invention have been described, these embodiments are not intended to limit the scope of the invention. Various modifications and changes may be made without departing from the spirit of the invention as set forth in the appended claims unless otherwise specified.

Effects described in the embodiments are preferred effects resulting from the invention and presented for illustrative purposes only, and the effects of the invention are not limited to the effects described in the embodiments.

REFERENCE SIGNS LIST

L1 First lens
L2 Second lens
S Aperture stop
L3 Third lens
L4 Fourth lens
L5 Fifth lens
L6 Sixth lens
CG Cover glass
Im Image surface

CITATION LIST

Patent Literature

PTL 1: Japanese Laid-open Patent Publication No. 09-166748
PTL 2: Japanese Laid-open Patent Publication No. 2000-180718
PTL 3: Japanese Laid-open Patent Publication No. 2003-131126

The invention claimed is:

1. An imaging optical system, comprising:
a first lens having a concave image side surface and having a negative refractive power;
a second lens having a convex object side surface and having a positive refractive power;
a third lens having a concave object side surface and having a negative refractive power;
a fourth lens having a convex image side surface and having a positive refractive power; and
a fifth lens having a convex object side surface and having a positive refractive power in an order from an object side to an image side, the imaging optical system being configured by six or fewer lenses in total, the imaging optical system satisfying the following conditional expressions:

$$1.94 < n_2 < 2.20; \text{ and} \quad [1]$$

$$15.0 < v_2 < 20.0, \quad [2]$$

where $n_2$ represents a refractive index of a lens material of the second lens at d-line, and $v_2$ represents an Abbe number of the lens material of the second lens at d-line, the Abbe number $v$ of a lens material at d-line being defined by $v=(n_d-1)/(n_F-n_C)$, where $n_C$, $n_d$, and $n_F$ represent refractive indices of the lens material at C-line, d-line, and F-line, respectively, the second lens has a concave image side surface, and the imaging optical system satisfies the following conditional expression:

$$0.00 < f/r_{22} < 0.40, \quad [3]$$

where f represents a focal length of the entire imaging optical system, and $r_{22}$ represents a radius of curvature of the image side surface of the second lens.

2. The imaging optical system according to claim 1, wherein the imaging optical system satisfies the following conditional expression:

$$1.20 < f_2/f < 2.20, \quad [4]$$

where $f_2$ represents a focal length of the second lens.

3. The imaging optical system according to claim 1, wherein the imaging optical system satisfies the following conditional expression:

$$0.10 < D_{4-5}/f < 0.35, \quad [6]$$

where $D_{4-5}$ represents a distance from an image side surface of the second lens to the object side surface of the third lens.

4. The imaging optical system according to claim 1, wherein the imaging optical system satisfies the following conditional expression:

$$-1.4 < r_{31}/f < -0.6, \quad [8]$$

where $r_{31}$ represents a radius of curvature of the concave object side surface of the third lens.

5. The imaging optical system according to claim 1, wherein the imaging optical system satisfies the following conditional expression:

$$0.7 < r_{31}/r_{42} < 1.0, \quad [9]$$

where $r_{31}$ represents a radius of curvature of the concave object side surface of the third lens, and $r_{42}$ represents a radius of curvature of the convex image side surface of the fourth lens.

6. The imaging optical system according to claim 1, wherein the imaging optical system satisfies the following conditional expressions:

$$3.2 < L/f < 4.2; \text{ and} \quad [10]$$

$$30 < \theta_{max} < 40, \quad [11]$$

where L represents a length from an object side surface of the first lens to an image surface of the imaging optical system, and $\theta_{max}$ (in units of degrees) represents a maximum half angle of view of the imaging optical system.

7. An imaging apparatus comprising the imaging optical system according to claim 1 as an image acquisition optical system.

8. An imaging optical system, comprising:
a first lens having a concave image side surface and having a negative refractive power;
a second lens having a convex object side surface and having a positive refractive power;
a third lens having a concave object side surface and having a negative refractive power;
a fourth lens having a convex image side surface and having a positive refractive power; and
a fifth lens having a convex object side surface and having a positive refractive power in an order from an object side to an image side, the imagine optical system being configured by six or fewer lenses in total, the imaging optical system satisfying the following conditional expressions:

$$1.94 < n_2 < 2.20; \text{ and} \quad [1]$$

$$15.0 < v_2 < 20.0, \quad [2]$$

where $n_2$ represents a refractive index of a lens material of the second lens at d-line, and $v_2$ represents an Abbe number of the lens material of the second lens at d-line, the Abbe number $v$ of a lens material at d-line being defined by $v=(n_d-1)/(n_F-n_C)$, where $n_C$, $n^d$, and $n_F$ represent refractive indices of the lens material at C-line, d-line, and F-line, respectively, and wherein the imaging optical system satisfies the following conditional expression:

$$-0.25 < f/f_{12} < 0.00, \quad [5]$$

where f represents a focal length of the entire imaging optical system, and $f_{12}$ represents a combined focal length of the first lens and the second lens.

9. An imaging optical system, comprising:
a first lens having a concave image side surface and having a negative refractive power;
a second lens having a convex object side surface and having a positive refractive power;
a third lens having a concave object side surface and having a negative refractive power;
a fourth lens having a convex image side surface and having a positive refractive power; and
a fifth lens having a convex object side surface and having a positive refractive power in an order from an object side to an image side, the imaging optical system being configured by six or fewer lenses in total, the imaging optical system satisfying the following conditional expressions:

$$1.94 < n_2 < 2.20; \text{ and} \quad [1]$$

$$15.0 < v_2 < 20.0, \quad [2]$$

where $n_2$ represents a refractive index of a lens material of the second lens at d-line, and $v_2$ represents an Abbe number of the lens material of the second lens at d-line, the Abbe number $v$ of a lens material at d-line being defined by $v=(n_d-1)/(n_F-n_C)$, where $n_C$, $n_d$, and $n_F$ represent refractive indices of the lens material at C-line, d-line, and F-line, respectively, and wherein the first lens has a concave object side surface, and the imaging optical system satisfies the following conditional expression:

$$-10.0 < r_{11}/f < -1.0, \quad [7]$$

where $r_{11}$ represents a radius of curvature of the concave object side surface of the first lens, and f represents a focal length of the entire imaging optical system.

* * * * *